3,532,698
REMOVAL OF CYANATE ION FROM URETHANE POLYMERS
Brian L. Phillips and Perry A. Argabright, Littleton, Colo., and Vernon J. Sinkey, South St. Paul, Minn., assignors to Marathon Oil Company, Findlay, Ohio, a corporation of Ohio
No Drawing. Filed Dec. 23, 1968, Ser. No. 786,405
Int. Cl. C08g 22/04
U.S. Cl. 260—248
9 Claims

ABSTRACT OF THE DISCLOSURE

A method of removing cyanate ion from urethane polymers, especially urethane drying oils, which involves contacting an organic solvent solution of the polymer with a bisulfate salt, particularly an alkali metal bisulfate, or a volatile organic acid such as formic acid.

---

In the preparation of certain urethane drying oils, the presence of minor amounts of reagents, or the like, used in the preparation of the oils can impart undesirable color characteristics to the oils. Exemplary of one method of preparing urethane drying oils wherein this condition is a factor is disclosed in co-pending U.S. application Ser. No. 514,721, filed Dec. 17, 1965. As disclosed in that application, urethane drying oils are prepared by reacting a hydroxyl-containing partial ester with an organic dihalide and a metal cyanate in the presence of an aprotic dipolar solvent such as dimethyl formamide. The urethane drying oils obtained by the method contain a small amount of residual cyanate ion due to the slight solubility of the metal cyanates in the solvents employed. When a drying agent such as cobalt naphthenate, for example, is added to the oils, a complex is formed which imparts an undesirable color to the finished oils.

In accordance with the present invention, there is provided a method of effectively removing cyanate ion from urethane polymers, especially urethane drying oils, whereby the color characteristics of the oils are substantially improved. Briefly, the method involves contacting an organic solvent solution of a urethane polymer with a member of the group consisting of bisulfate salts and volatile organic acids to effect conversion of the cyanate ion present to isocyanic acid. The addition of the salt or acid can be carried out during the normal processing of the polymers, or after processing.

The reaction between the cyanate ion present in the urethane polymer and the bisulfate salt can be illustrated by the following equation:

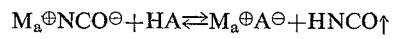
$$M_a{}^\oplus NCO^\ominus + M_b{}^\oplus HSO_4{}^\ominus \rightleftarrows M_a{}^\oplus M_b{}^\oplus SO_4{}^\ominus + HNCO\uparrow$$

wherein $M_a$ is a metal ion selected from the group consisting of Li, Na, K, Rb, Cs, Ag, Be, Ca, Mg, Pb and organic radicals which act as metals exemplified by pyridinium and tetraalkyl ammonium radicals; and wherein $M_b$ is any metal ion which imparts to the bisulfate some solubility in the organic solvent medium employed in effecting removal of the cyanate ion. While a wide variety of bisulfate salts can be utilized in the practice of the invention, the salts most advantageously are alkali metal bisulfates exemplary of which are sodium bisulfate, potassium bisulfate lithium bisulfate, rubidium bisulfate and cesium bisulfate. Of this group, sodium bisulfate and potassium bisulfate are preferred.

The manner in which the bisulfate salt is contacted with the cyanate ion-containing urethane polymers is not critical. Thus, for example, the salt may be added directly to an organic solvent solution of the urethane polymer and mixed therewith until the reaction is essentially complete. The resulting solution can then be filtered and the filtrate subjected to distillation to yield the desired urethane polymer. An alternative procedure for removing cyanate ion from the polymer involves placing the bisulfate salt in a column and then passing a solution of the urethane polymer through the column. The recovered solution of the polymer can then be subjected to distillation, as before, to yield an essentially cyanate ion free product.

The quantity of bisulfate salt employed will vary in accordance with the amount of cyanate ion present in the urethane polymer solution. In any event, the amount of bisulfate salt used should be sufficient to react with substantially all of the cyanate ion present. To this end, it is preferred to utilize an appreciable excess of the salt to assure good contact with the liquid phase.

The reaction between the cyanate ion and the volatile organic acids having utility for the purposes of this invention can be illustrated by the following equation

$$M_a{}^\oplus NCO^\ominus + HA \rightleftarrows M_a{}^\oplus A^\ominus + HNCO\uparrow$$

wherein $M_a$ is as described above. The acids used in effecting removal of the cyanate ion are characterized in that they have a boiling point at 760 mm. of less than about 150° C., especially desirably between about 90° C. to about 130° C., and an acid constant of less than about 6, usually from about 2 to about 5. The acid, further, should at least be partially soluble in the processing solvent medium. Specific examples of acids which meet these criteria are formic acid, acetic acid, propionic acid, difluoroacetic acid and trifluoroacetic acid. Of this group, trifluoroacetic acid is preferred.

As in the case of the bisulfate salts, the manner in which the acid is contacted with the urethane polymers is not critical. From the standpoint of convenience, the acid advantageously is introduced in increments into a solvent solution of the urethane polymer until a green color is no longer detected when a drop of cobalt naphthenate, for example, is added to a sample of the polymer solution. Also, as in the case of the bisulfate salts, the quantity of acid used will vary according to the amount tof cyanate ion present. Excess acid employed in effecting removal can easily be separated from the cyanate ion free polymer by distillation.

The solvent medium in which the cyanate ion removal is carried out may be the same as that in which formation of the urethane polymers was accomplished or one in which the polymers was dissolved after separation from the processing medium. In either case, the solvent employed should be one which is essentially inert with respect to both the urethan polymer and the agent, whether bisulfate salt or organic acid, used to remove cyanate ion from the solution, and, particularly in those instances where an organic acid is employed, the solvent should have a boiling point which is higher than that of the acid. Thus, the solvents having utility in the practice of this invention may be aprotic solvents such as those used in the preparation of urethane drying oils as disclosed in the aforementioned co-pending application Ser. No. 514,721. Exemplary of such solvents are alkyl pyrrolidones; examples of which are N-methyl-pyrrolidone-2-N-ethyl-pyrrolidone- sulfoxides exemplified by dimethylsulfoxide and diethylsulfoxide; alkyl amides including N,N-dimethylformamide, N,N-diethylformamide, N,N-dimethylacetamide and N,N-diethylacetamide; alkylphosphoramides and arylphosphoramides such as hexamethylphosphoramide, hexaethylphosphoramide and hexaphenylphosphoramide; nitriles examples of which are acetonitrile and benzonitrile; alkylureas such as tetramethylurea and tetraethylurea; and the like; and compatible mixtures thereof. Examples of other solvents useful for the purposes of the preesnt invention, especially in those instances where the urethane polymer has been separated from the processing medium and it is desired to remove residual cyanate ion from the polymer, are hydrocarbon solvents such as mineral spirits, VMP naphtha, xylenes, and the like; and compatible mixtures thereof.

In order that the full details of the present invention will be even better understood, the following examples are provided. These examples are illustrative of the practice of the method of the invention and it should be understood that variations may be made therein in a number of particulars without in any way departing from the fundamental principles and teachings provided herein. The examples, therefore, are not to be construed as limitative of the scope of the invention.

EXAMPLE I

In accordance with the method described in said copending application Ser. No. 514,721, 200.0 g. clay-treated raw linseed oil is charged to a 500 ml. resin pot equipped with a magnetic stirrer, a reflux condenser, a dropping funnel, a thermometer, and a nitrogen inlet tube extending to the bottom of the pot. The oil is degassed by stirring 20 minutes at room temperature while $N_2$ is bubbled from the inlet tube. The oil is heated to 235° C. and held at this temperature by a thermowatch. 0.85 g. PbO is added as a transesterification catalyst, followed by dropwise addition of 43.2 g. glycerol over 1 hour. The mixture is stirred at 235° C. for an additional 4 hours then cooled. A slow $N_2$ flow is maintained in the reaction vessel throughout the above sequence.

The products are taken up in $Et_2O$ and washed 4 times with 10% aqueous $Na_2SO_4$ to remove excess glycerol. The ether is dried over anhydrous $MgSO_4$ and filtered. The ether is stripped off to yield the glycerides as a yellow-orange oily slush.

Twenty-five (25) g. of the above product is dissolved in 75 ml. purified dimethyl formamide (DMF). This solution is added to a 500 ml. reaction flask equipped with a mechanical stirrer, a reflux condenser with a mineral oil bubbler at the open end to maintain a constant head of $N_2$, an addition funnel, and a thermometer with thermowatch. 21.7 g. dry KOCN is added and the resulting slurry is held at 100° C. while 11.1 g. 1,4-dichloro-2-butene in 25 ml. DMF is added over 2–4 hours. The reaction mixture is stirred for an additional 2–4 hours at 100° C., then cooled. The reaction mixture is filtered, and the DMF filtrate is subjected to distillation under vacuum to yield a viscous oil. The oil is taken up in mineral spirits and filtered. This solution contains a small amount of dissolved cyanate salt and immediately turns green if cobalt naphthenate is added. The oil solution is placed in a suction flask and 40 g. of fused $NaHSO_4$ is added. The mixture is stirred while a nitrogen stream is bubbled through the slurry and vented through the side arm. This treatment is continued until a green color is not detected when a drop of cobalt naphthenate is added to a small sample of the oil solution. The suspended salts are then removed by filtration, and the oil is ready for further processing.

EXAMPLE II

A solution of a urethane drying oil in mineral spirits is prepared as in Example I and transferred to a suction flask. Trifluoroacetic acid is added dropwise to the stirred solution while a stream of nitrogen is passed over the top of the liquid and vented out the side arm. The addition is halted when a green color is not formed upon mixing a small sample of the oil solution with a drop of cobalt naphthenate. The liquid is then purged with nitrogen, and any unreacted trifluoroacetic acid is removed by heating the oil solution under vacuum. The product is now ready for further processing.

EXAMPLE III 220 g. of Safflower oil is mixed with 34.0 g. of pentaerythritol in a resin pot equipped with an overhead stirrer, nitrogen inlet and thermometer. Nitrogen is bubbled through the mixture at 0.04 cu. ft./gal. min. and the temperature is raised to 235° C. Upon reaching temperature 0.68 g. of Ca. Octoate catalyst is added. After stirring for 50 minutes at temperature 37.0 g. of phthalic anhydride (0.25 mole) is added and the mixture stirred for an additional 3 hours at 235° C. The solution is then cooled to room temperature and analyzed; acid number=2.69, hydroxyl number=121. 50 g. of the above product is diluted with 150 ml. of dimethyl formamide. 9.0 g. of p-xylene dichloride, 9.70 g. of KNCO and 0.63 g. of dibutyl tin dilaurate are added. The mixture is heated to 100° C. for 2.5 hours with good stirring under a nitrogen atmosphere. The solution is then cooled to room temperature, filtered and the dimethyl formamide stripped off. The resulting resin is then dissolved in mineral spirits and treated with 50 g. of potassium bisulfate to remove excess cyanate ion. The bisulfate is then filtered off and the solids content of the solution adjusted to 65% by removing some of the mineral spirits. 0.2% Pb and 0.02% Co in the form of the naphthenates are then added as driers.

The resulting coating solution has the following properties: Gardner viscosity=T at 65% solids, Gardner=10. This coating solution is then applied to a steel panel, four mil wet thickness. Tests of the coating show the following properties:

Tack free time=<24 hrs.
Sward hardness:
   1 day=4
   5 days=24
   7 days=28
Dryfilm thickness=1.0 mil
Forward impact—pass 120 in lb.
Reverse impact—pass 120 in lb.
Mandrel—passes ⅛"

What is claimed is:
1. A method of removing cyanate ion from urethane polymers containing same, comprising adding to an organic solvent solution of a urethane polymer a bisulfate salt or a volatile organic acid capable in the solution of converting the cyanate ion to isocyanic acid, and recovering the essentially cyanate ion free urethane polymer.
2. A method according to claim 1 wherein the bisulfate salt is an alkali metal bisulfate.
3. A method according to claim 1 wherein the organic acid has an acid constant of less than about 6 and a boiling point of less than about 150° C.
4. A method according to claim 2 wherein the alkali metal bisulfate is sodium or potassium bisulfate.
5. A method according to claim 3 wherein the organic acid is selected from the group consisting of formic acid, acetic acid, propionic acid, difluoroacetic acid and trifluoroacetic acid.
6. A method according to claim 1 wherein the urethane polymer is the reaction product of a hydroxyl-containing partial ester, an organic dihalide and a metal cyanate.
7. A method according to claim 1 wherein the organic solvent solution comprises an aprotic solvent or a hydrocarbon solvent.

8. A method according to claim 1 wherein any excess bisulfate salt present is removed by filtration.

9. A method according to claim 1 wherein any excess acid present is removed by distillation.

References Cited

Trusell et al.: Analytical Chem., vol. 39, pp. 1025–6 (1967).

HENRY R. JILES, Primary Examiner

J. M. FORD, Assistant Examiner

U.S. Cl. X.R.

260—77.5, 471, 482